United States Patent [19]

Duggan

[11] 4,169,571
[45] Oct. 2, 1979

[54] HOSE CRADLES

[76] Inventor: William G. Duggan, 280 Fiddleneck St., Lake Isabella, Calif. 93240

[21] Appl. No.: 893,479

[22] Filed: Apr. 4, 1978

[51] Int. Cl.² ............................................. F16L 3/00
[52] U.S. Cl. ........................................ 248/49; 248/83; 248/166; 248/439
[58] Field of Search .................. 248/75, 80, 81, 49, 248/377, 439, 434, 166, 83, 188.6; 297/255; 108/1, 8, 12

[56] References Cited

U.S. PATENT DOCUMENTS

| 675,106 | 5/1901 | Oberle | 248/49 |
|---|---|---|---|
| 1,367,369 | 2/1921 | Friend | 248/166 |
| 2,442,904 | 6/1948 | Reeh | 248/81 |
| 2,498,406 | 2/1950 | Fay | 248/168 X |
| 2,563,410 | 8/1951 | Micek | 248/166 |
| 3,169,741 | 2/1965 | Bittner | 248/49 |
| 3,288,406 | 11/1966 | Degen | 248/49 |
| 3,406,933 | 10/1968 | Wait et al. | 248/80 |
| 3,572,622 | 3/1971 | Smith | 248/49 |
| 3,730,228 | 5/1973 | Gibb | 248/49 X |
| 3,809,348 | 5/1974 | Di Laura | 248/49 |
| 3,819,137 | 6/1974 | Smith | 248/80 |
| 4,017,046 | 4/1977 | Hicks | 248/49 X |

FOREIGN PATENT DOCUMENTS 1360567 4/1964 France .................................. 297/255

Primary Examiner—Lawrence J. Staab
Attorney, Agent, or Firm—Max E. Shirk

[57] ABSTRACT

A plurality of hose cradles support a sloping, flexible sewer hose. Each hose cradle includes a trough to each end of which a pair of legs is swingably connected in a manner such that the legs may be swung from vertical positions to outwardly swung horizontal positions or to inwardly-swung, nesting positions.

2 Claims, 7 Drawing Figures

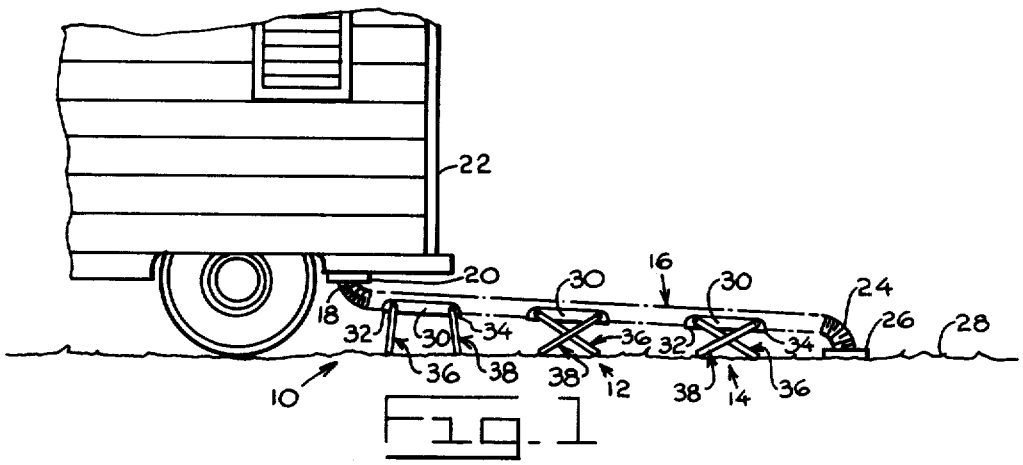
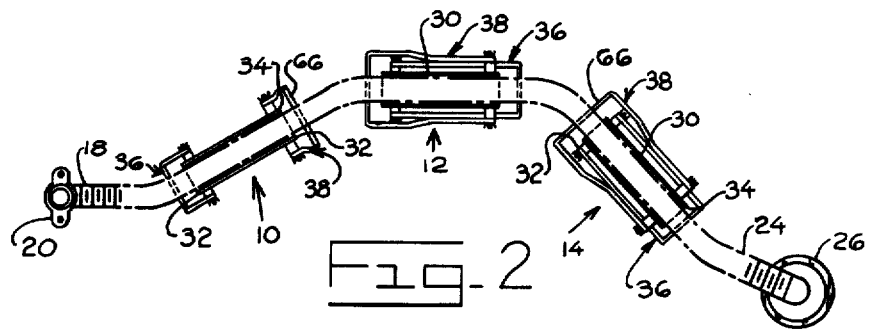
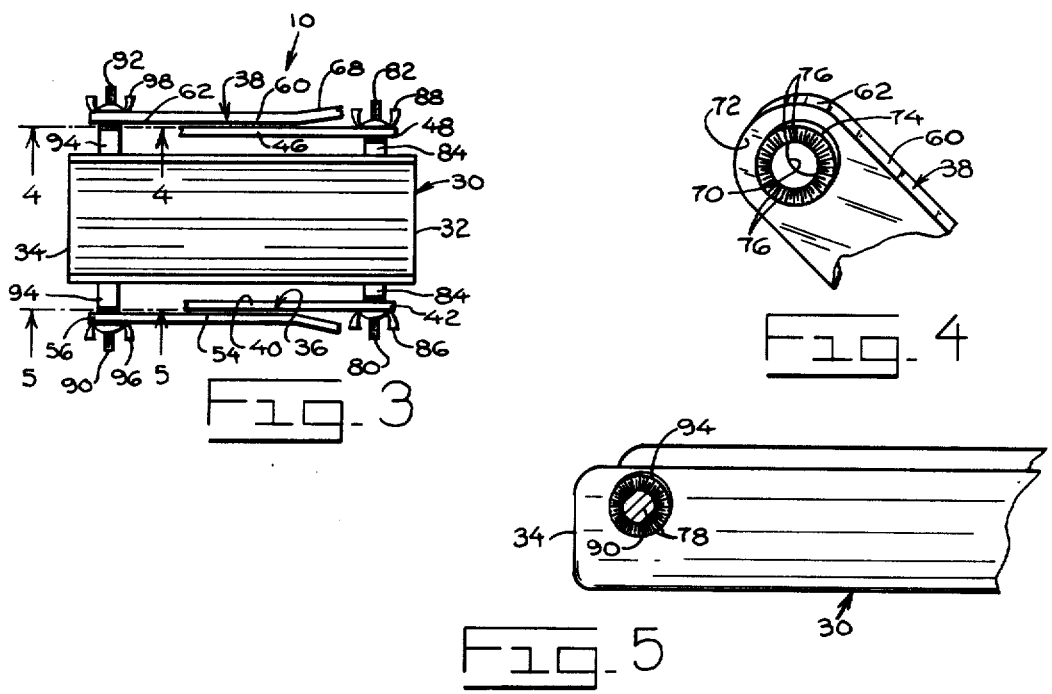

HOSE CRADLES

BACKGROUND OF THE INVENTION

The background of the invention will be set forth in two parts.

1. Field of the Invention

The present invention pertains generally to the field of hose supports and more particularly to a plurality of new and useful hose cradles adapted to be positioned in spaced-apart relation at different elevations beneath a sloping, flexible sewer hose.

2. Description of the Prior Art

The prior art known to Applicant is listed by way of illustration, but not of limitation, in separate communications to the United States Patent Office.

The present invention exemplifies improvements over this prior art.

SUMMARY OF THE INVENTION

According to the present invention, a plurality of hose cradles are used to support a flexible hose having one end adapted to be connected to a holding tank at a first elevation and another end adapted to be connected to a sewer at a lower elevation than the first elevation so that the hose inclines downwardly from the tank to the sewer.

Each cradle comprises a trough having first and second ends, a first pair of legs having upper ends and lower ends with the lower ends being connected together in spaced-apart relation by a bight portion, a second pair of legs, having upper ends and lower ends with the lower ends being connected together in spaced-apart relation by a bight portion of greater length than the bight portion on the first pair of legs so that the first pair of legs will nest inside the second pair of legs, a first pair of bolts pivotally connects the upper ends of the first pair of legs to one end of the trough, a second pair of bolts pivotally connects in the upper ends of the second pair of legs to the other end of the trough with spacers on the second pair of bolts for maintaining the upper ends of the second pair of legs in a spaced-apart relation having a greater span than the distance between the upper ends of the first pair of legs so that the first pair of legs will nest inside the second pair of legs and a wing nut for connecting each leg to its associated bolt.

The inside edge of each upper leg may be serrated and serrations may be provided on each bolt for engaging the serrations on the legs to facilitate maintaining the legs in different rotated positions. Each trough may be 10 to 12 inches long so that from three to five cradles may be used to support a 10-foot hose under most conditions, including curved patterns. The legs may be adjusted to many different heights and slopes for imparting an optimum slope to the hose from the tank to the sewer.

The features of the present invention which are believed to be novel are set forth with particularity in the appended claims. The present invention both as to its organization and manner of use, together with further objects and advantages thereof, may best be understood by reference to the following description, taken in connection with the accompanying drawings in which like reference characters refer to like elements in the several views.

BRIEF DESCRIPTION OF THE DRAWINGS

FIG. 1 is an elevational view showing three hose cradles of the present invention in position supporting a flexible hose having one end connected to a holding tank on a recreational vehicle and its other end connected to a sewer;

FIG. 2 is a plan view of the hose and cradles of FIG. 1;

FIG. 3 is an enlarged, plan view of one of the cradles of FIG. 1;

FIG. 4 is an enlarged, partial perspective view of the upper end of one of the legs of one of the cradles of FIG. 1 taken in the direction of arrows 4—4 in FIG. 3;

FIG. 5 is an enlarged, partial perspective view taken in the direction of arrows 5—5 in FIG. 3;

DESCRIPTION OF THE PREFERRED EMBODIMENT

Figure 6:
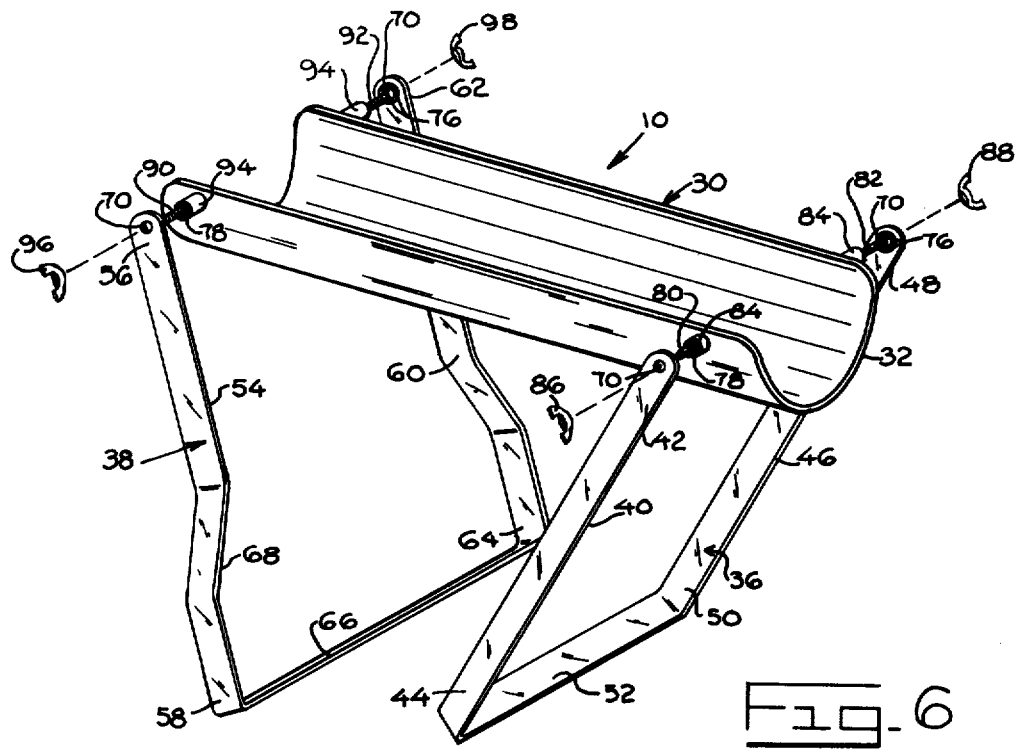
FIG. 6 is an enlarged, exploded perspective view of one of the cradles of FIG. 1.

Referring again to the drawings, and more particularly to FIGS. 1 and 2, three hose cradles each constituting a presently-preferred embodiment of the invention, generally designated 10, 12, 14, are shown in combination with a flexible hose 16 having a first end 18 connected to a holding-tank outlet 20 on a recreational vehicle 22 and the second end 24 connected to a sewer inlet 26 provided on a suitable surface 28 which supports vehicle 22 and hose cradles 10, 12, 14. Hose 16 may be of the type conventionally used with recreational vehicles and may have about a 10-foot length when extended from a normally retracted condition. Such hoses are usually about three inches in diameter.

Each cradle includes a trough 30 having a first end 32 and a second end 34. A first pair of legs 36 is swingably connected to each end 32 and a second pair of legs 38 is swingably connected to each end 34. These legs may be swung to different positions, as shown in FIG. 1, to support hose 16 on a suitable slope. It has been found that three to five cradles having 10-inch to 12-inch troughs and 12-inch legs will support a 10-foot hose on either level or flat terrain in either straight or curved patterns. Referring now to FIGS. 3 and 6, since the cradles 10, 12, 14 are identical, only the cradle 10 will be described in detail. Trough 30 is U-shaped in cross section and may be made from any suitable material. One set was made by taking 10-inch to 12-inch lengths of 4-inch galvanized pipe and cutting them in half lengthwise. Ends 32 and 34 were then rounded off as shown in FIG. 6. It will be clear to those skilled in the art, on the other hand, that suitable troughs could be made from polymeric materials, fiberglass, aluminum or wire caging.

The pair of legs 36 includes a first leg 40 having an upper end 42 and a lower end 44 and a second leg 46 having an upper end 48 and a lower end 50. The lower ends 44, 50 are connected together in spaced-apart relation by a member 52 forming a bight portion of legs 36.

The pair of legs 38 includes a first leg 54 having an upper end 56 and a lower end 58 and a second leg 60 having an upper end 62 and a lower end 64. The lower ends 58, 64 are connected together in spaced-apart relationship by a member 66 forming a bight portion of greater length than the bight portion 52 on the first pair of legs 36 so that the first pair of legs will nest inside the second pair of legs 38. The legs 54, 60 each includes an outwardly flaring portion 68 resulting in a wider bight portion 66 for increased stability.

As best shown in FIG. 4 for the upper end 62 of leg 50, each upper end is provided with an aperture 70 and includes an inner surface 72 to which a washer 74 is affixed in encompassing relationship with aperture 70. The exposed face of each washer 74 is provided with a plurality of serrations 76 coacting with other serrations, like those shown at 78 in FIG. 5 to facilitate maintaining legs 36, 38 in different rotated positions.

The upper ends 42, 48 of legs 36 may be pivotally connected to end 32 of trough 30 by engaging aperture 70 on first and second bolts 80, 82, respectively. Bolts 80, 82 each carries a spacer 84 which is affixed to end 32 of trough 30. Each spacer 84 has an outwardly facing portion which carries the serrations 78. Legs 36 may be maintained in different rotated positions by a pair of wing nuts 86, 88 threadedly engaging bolts 80, 82, respectively.

The upper ends 56, 62 of legs 38 may be pivotally connected to end 34 of trough 30 by engaging aperture 70 on second and third bolts 90, 92, respectively. Bolts 90, 92 each carry a spacer 94 which is affixed to end 34 of trough 30. It should be noted at this point that spacers 94 are longer than spacers 84 so that legs 54, 60 will be maintained in a spaced-apart relation having a greater span than the distance between the upper ends 42, 48 of the first pair of legs 36 permitting the first pair of legs to nest inside the second pair of legs. Spacers 94 also include an outer face which is provided with serrations 78. Legs 54, 60 are maintained in position on bolts 90, 92 by wing nuts 96, 98, respectively.

Figure 7:
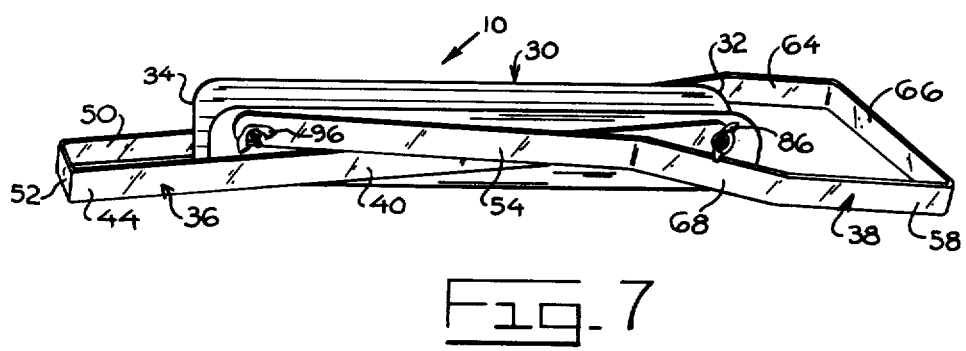
FIG. 7 is an enlarged perspective view of one of the hose cradles of FIG. 1 showing the legs in a collapsed, nested position.

Referring now to FIG. 7, cradles 10, 12, 14 may be folded flat, as shown for cradle 10, by nesting legs 36 inside legs 38. A plurality of cradles may then be stacked on top of each other for convenient storage in a minimum of space.

Legs 36, 38 may also be made from a number of different materials. For example, several cradles were made by bending scrap iron to form the legs. Apertures 70 were then drilled in the upper ends of the legs and small bolts were welded to spacers which in turn, were welded to the metal troughs.

Use of cradles 10, 12, 14 is believed to be apparent from the foregoing and will be briefly summarized at this point in connection with FIGS. 1 and 2. End 18 of hose 16 may be connected to outlet 20 and end 24 may be connected to inlet 26. A suitable number of hose cradles may then be selected to support hose 16 with a suitable slope and pattern. In the example shown in the drawings, the legs on cradle 10 were extended to approximately vertical positions for maximum height with the lower ends of legs 38 positioned slightly downstream toward inlet 26 to make trough 30 slope downwardly slightly from end 18 toward end 24 of hose 16. Trough 30 on cradle 12 was given less height by crossing legs 40, 46 inside of legs 54, 60 a desired amount. The legs on cradle 14 were crossed somewhat more than the legs on cradle 12 to position trough 30 on cradle 14 at a slightly lower elevation than trough 30 on cradle 12. The legs on cradles 12 and 14 were crossed in such a manner that their associated troughs would have a slight downward slope from end 18 to end 24 of hose 16. Legs 36, 38 may be quickly and easily moved to rotated positions and held firmly therein by loosening their associated wing nuts, swinging the legs to desired positions and then tightening the wing nuts to bring serration 76 into engagement with serration 78.

While the particular hose cradles herein shown and described in detail are fully capable of obtaining the objects and providing the advantages herein before stated, it is to be understood that they are merely illustrative of the presently-preferred embodiment of the invention and that no limitations are intended to the details of construction or design herein shown other than as defined in the appended claims, which form a part of this disclosure.

Whenever the term "means" is employed in these claims, this term is to be interpreted as defining the corresponding structure illustrated and described in this specification or the equivalent of the same.

What is claimed is:

1. In combination with a flexible hose having one end adapted to be connected to a holding tank at a first elevation and another end adapted to be connected to a sewer at a lower elevation than said first elevation, whereby said hose inclines downwardly from the tank to the sewer, a plurality of hose cradles each comprising:
    a one-piece, U-shaped trough having a length of approximately 10–12 inches, a first end and a second end;
    a first pair of legs having upper ends and lower ends, each of said upper ends being provided with an aperture, said lower ends being connected together in spaced-apart relation by a bight portion;
    a second pair of legs having upper ends and lower ends, each of said upper ends being provided with an aperture, said lower ends being connected together in spaced-apart relation by a bight portion of greater length than the bight portion on said first pair of legs, whereby said first pair of legs will nest inside said second pair of legs;
    first means engaging associated ones of said apertures for pivotally connecting said upper ends of said first pair of legs to one end of said trough;
    second means engaging associated ones of said apertures for pivotally connecting said upper ends of said second pair of legs to the other end of said trough, said second means including a spacer for each of said upper ends of said second pair of legs for maintaining said second pair of legs in a spaced-apart relation having a greater span than the distance between the upper ends of said first pair of legs, whereby said first pair of legs will nest inside said second pair of legs; and
    third means for readily and easily maintaining each pair of said upper ends in selected rotated positions, whereby the slope and height of said trough may be varied.

2. A combination as stated in claim 1 wherein said first means comprises first and second bolts affixed to said one end of said trough, said first and second bolts each carrying a serrated spacer at its point of attachment to said trough, wherein said second means comprises third and fourth bolts affixed to said other end of said trough, said spacers for said upper ends of said second pair of legs each being carried by an associated one of said third and fourth bolts at its point of attachment to said trough, being thicker than said spacers on said first and second bolts and being provided with serrations and wherein said third means includes serrations on each of said upper ends of said legs in mating engagement with associated ones of said serrated spacers and wing nuts threadedly engaging associated ones of said bolts.

* * * * *